United States Patent
Kohda

(10) Patent No.: US 10,992,007 B2
(45) Date of Patent: Apr. 27, 2021

(54) BATTERY, BATTERY CASE, AND ELECTRIC VEHICLE

(71) Applicant: YAMAHA HATSUDOKI KABUSHIKI KAISHA, Iwata (JP)

(72) Inventor: Hideo Kohda, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 633 days.

(21) Appl. No.: 15/083,820

(22) Filed: Mar. 29, 2016

(65) Prior Publication Data

US 2016/0308180 A1 Oct. 20, 2016

(30) Foreign Application Priority Data

Apr. 16, 2015 (JP) .............................. JP2015-084305

(51) Int. Cl.
*H01M 50/20* (2021.01)
*H01M 50/202* (2021.01)
*H01M 50/204* (2021.01)
*H01M 50/207* (2021.01)
*H01M 50/209* (2021.01)
(Continued)

(52) U.S. Cl.
CPC ............. *H01M 50/20* (2021.01); *B60L 50/20* (2019.02); *B60L 50/64* (2019.02); *B60L 50/66* (2019.02); *H01M 10/0525* (2013.01); *H01M 10/0585* (2013.01); *H01M 10/425* (2013.01); *H01M 10/4257* (2013.01); *B60L 2200/12* (2013.01);
(Continued)

(58) Field of Classification Search
None
See application file for complete search history.

(56) References Cited

U.S. PATENT DOCUMENTS

2006/0216600 A1 9/2006 Inagaki et al.
2010/0015513 A1 1/2010 Nakahama et al.
(Continued)

FOREIGN PATENT DOCUMENTS

EP 2 549 580 A1 1/2013
EP 2 693 520 A1 2/2014
(Continued)

OTHER PUBLICATIONS

English translation of JP 2012/156014 (Year: 2012).*

*Primary Examiner* — Yoshitoshi Takeuchi
(74) *Attorney, Agent, or Firm* — Keating and Bennett, LLP

(57) ABSTRACT

A battery case includes a first cell accommodating portion that accommodates a first number of battery cells, and a second cell accommodating portion that accommodates a second number of battery cells, smaller than the first number. The second cell accommodating portion is shorter than the first cell accommodating portion in one of three directions parallel to sides of the battery case. The battery case further includes a board accommodating portion, which is adjacent to the second cell accommodating portion in the one of the three directions, and that accommodates a circuit board therein; a first partition wall arranged between the first cell accommodating portion and the board accommodating portion; and a second partition wall arranged between the second cell accommodating portion and the board accommodating portion. Thus, the thickness of the battery is reduced and the circuit board is separated from the battery cells.

18 Claims, 8 Drawing Sheets

(51) Int. Cl.
*H01M 50/211* (2021.01)
*H01M 50/213* (2021.01)
*H01M 50/216* (2021.01)
*H01M 50/218* (2021.01)
*H01M 50/22* (2021.01)
*H01M 50/222* (2021.01)
*H01M 50/224* (2021.01)
*H01M 50/227* (2021.01)
*H01M 50/229* (2021.01)
*H01M 50/231* (2021.01)
*H01M 50/233* (2021.01)
*H01M 50/236* (2021.01)
*H01M 50/238* (2021.01)
*H01M 50/24* (2021.01)
*H01M 50/242* (2021.01)
*H01M 50/244* (2021.01)
*H01M 50/247* (2021.01)
*H01M 50/249* (2021.01)
*H01M 50/251* (2021.01)
*H01M 50/253* (2021.01)
*H01M 50/262* (2021.01)
*H01M 50/264* (2021.01)
*H01M 50/267* (2021.01)
*H01M 50/269* (2021.01)
*H01M 50/271* (2021.01)
*H01M 50/273* (2021.01)
*H01M 50/276* (2021.01)
*H01M 50/278* (2021.01)
*H01M 50/28* (2021.01)
*H01M 50/282* (2021.01)
*H01M 50/284* (2021.01)
*H01M 50/287* (2021.01)
*H01M 50/289* (2021.01)
*H01M 50/291* (2021.01)
*H01M 50/293* (2021.01)
*H01M 50/296* (2021.01)
*H01M 50/298* (2021.01)
*H01M 10/42* (2006.01)
*B60L 50/20* (2019.01)
*B60L 50/64* (2019.01)
*B60L 50/60* (2019.01)
*H01M 10/0525* (2010.01)
*H01M 10/0585* (2010.01)

(52) U.S. Cl.
CPC ............... *H01M 2010/4271* (2013.01); *H01M 2220/20* (2013.01); *Y02T 10/70* (2013.01)

(56) References Cited

U.S. PATENT DOCUMENTS

| | | | |
|---|---|---|---|
| 2013/0130070 A1* | 5/2013 | Adachi | H01M 10/4207 429/53 |
| 2013/0264134 A1 | 10/2013 | Matsuda | |
| 2014/0017542 A1 | 1/2014 | Suzuki | |
| 2014/0017551 A1* | 1/2014 | Suzuki | H01M 2/0237 429/152 |
| 2014/0220396 A1 | 8/2014 | Lee et al. | |
| 2015/0228945 A1 | 8/2015 | Maruoka | |

FOREIGN PATENT DOCUMENTS

| | | | |
|---|---|---|---|
| JP | 2001-057192 A | 2/2001 | |
| JP | 2007-87909 A | 4/2007 | |
| JP | 2012/156014 * | 8/2012 | .............. H01M 2/10 |
| JP | 2012-212594 A | 11/2012 | |
| JP | 2012-238598 A | 12/2012 | |
| WO | 2014/034932 A1 | 3/2014 | |

* cited by examiner

BATTERY, BATTERY CASE, AND ELECTRIC VEHICLE

BACKGROUND OF THE INVENTION

1. Field of the Invention

The present invention relates to a battery, a battery case, and an electric vehicle, for example, a straddle type vehicle.

2. Description of the Related Art

In Japanese Patent Application Laid-open No. 2007-087909, there is disclosed a battery pack constructed such that, together with a printed wiring board, a battery stack including a plurality of stacked unit cells is housed in a housing vessel having a rectangular parallelepiped shape.

Thinning of a battery to be mounted to an electric vehicle or the like may be required. For example, in a straddle type electric vehicle, in general, the battery is arranged below a seat. Accordingly, it is preferred that the battery be thin in a vehicle width direction so as to enable a rider to easily straddle the vehicle.

Further, in a battery to be mounted to the electric vehicle or the like, in addition to battery cells, a circuit board that controls charging and storing of an amount of a remaining charge is sometimes provided. It is desirable to use a configuration capable of preventing the circuit board from being soaked in a leaking electrolyte even if or when electrolyte leaks from the battery cells.

SUMMARY OF THE INVENTION

Preferred embodiments of the present invention provide a battery, a battery case, and/or an electric vehicle that achieve thinning of the battery, and/or of separating a circuit board from the battery cells.

The preferred embodiments of the present invention obviate or at least mitigate one or more problems or disadvantages in the prior art.

Various preferred embodiments of the present invention and preferred features are defined below.

According to one preferred embodiment of the present invention there is provided a battery, such as an electric battery.

The battery preferably includes a plurality of battery cells. The battery preferably includes a circuit board, which is preferably electrically connected to the plurality of battery cells. The battery preferably includes a battery case, which preferably has a rectangular or substantially rectangular parallelepiped shape. The battery case preferably accommodates the plurality of battery cells and the circuit board therein. The battery case preferably includes a first cell accommodating portion, which preferably has a rectangular or substantially rectangular parallelepiped shape. The first cell accommodating portion preferably accommodates a first number of the plurality of battery cells therein. The battery case preferably includes a second cell accommodating portion, which preferably has a rectangular or substantially rectangular parallelepiped shape. The second cell accommodating portion preferably accommodates a second number of the plurality of battery cells therein. The battery case preferably includes a board accommodating portion, which preferably accommodates the circuit board therein. The second number is preferably smaller than the first number. The second cell accommodating portion is preferably shorter than the first cell accommodating portion, e.g. in one of three directions parallel to sides of the battery case. The board accommodating portion is preferably adjacent to the second cell accommodating portion in the one of the three directions. The battery case preferably includes a first partition wall, which is preferably arranged between the first cell accommodating portion and the board accommodating portion. The battery case preferably includes a second partition wall, which is preferably arranged between the second cell accommodating portion and the board accommodating portion.

The number of battery cells accommodated in the second cell accommodating portion is preferably smaller than the number of battery cells accommodated in the first cell accommodating portion. The second cell accommodating portion is preferably shorter than the first cell accommodating portion in length, e.g., in the one of the three directions, and a space (defined by this structure) is preferably used as the board accommodating portion, thus reducing an entire thickness of the battery including the cell accommodating portions and the board accommodating portion. The partition wall is preferably arranged between the board accommodating portion and each of the cell accommodating portions. Thus, even when an electrolyte leaks from the battery cells, the circuit board is prevented or at least mitigated from being soaked in the leaking electrolyte.

The first partition wall preferably includes a first edge positioned on the second partition wall side.

The second partition wall preferably includes a second edge positioned on the first partition wall side.

The first edge and the second edge are preferably connected to each other at a connection portion.

The first partition wall and the second partition wall are preferably integral and unitary with each other at the connection portion.

An angle defined by the first partition wall and the second partition wall at the connection portion is preferably about 90 degrees, for example.

The second number of the plurality of battery cells are preferably stacked on each other in the one of the three directions.

The first number of the plurality of battery cells are preferably stacked on each other in the one of the three directions.

The circuit board is preferably parallel or substantially parallel to a surface which extends perpendicular or substantially perpendicular to the one of the three directions.

The battery case preferably includes a pair of half case bodies, which are preferably dividable in the one of the three directions, and preferably define the first cell accommodating portion and the second cell accommodating portion when the pair of half case bodies are combined together.

One of the pair of half case bodies preferably includes an inward opening recessed portion that opens to an inside of the battery case, and that preferably defines a portion of the first cell accommodating portion.

One of the pair of half case bodies preferably includes an outward opening recessed portion that opens to an outside of the battery case, and that preferably defines at least a portion of the board accommodating portion.

The inward opening recessed portion and the outward opening recessed portion preferably share the first partition wall.

The second partition wall preferably defines a bottom portion of the outward opening recessed portion.

The battery case preferably includes a cover that covers the outward opening recessed portion.

The battery preferably includes a plurality of cushion members arranged between the battery case and the plurality of battery cells.

At least one of the plurality of cushion members that is arranged in the second cell accommodating portion is preferably thicker than at least one of the plurality of cushion members that is arranged in the first cell accommodating portion.

One of the first partition wall and the second partition wall preferably includes a through-hole through which a lead wire connecting the plurality of battery cells and the circuit board to each other is led or fed, and the through-hole through which the lead wire is led is sealed.

The battery preferably includes a connector adjacent to the second cell accommodating portion in the one of the three directions, and that is electrically connected to the circuit board.

According to another preferred embodiment of the present invention there is provided a battery case.

The battery case preferably has a rectangular or substantially rectangular parallelepiped shape.

The battery case preferably accommodates a plurality of battery cells and a circuit board electrically connected to the plurality of battery cells.

The battery case preferably includes a first cell accommodating portion, which preferably has a rectangular or substantially rectangular parallelepiped shape.

The first cell accommodating portion preferably accommodates a first number of the plurality of battery cells therein.

The battery case preferably includes a second cell accommodating portion, which preferably has a rectangular or substantially rectangular parallelepiped shape.

The second cell accommodating portion preferably accommodates a second number of the plurality of battery cells therein.

The second number is preferably smaller than the first number. The second cell accommodating portion is preferably shorter than the first cell accommodating portion, e.g., in one of the three directions parallel to sides of the battery case.

The battery case preferably includes a board accommodating portion, which is preferably adjacent to the second cell accommodating portion in the one of the three directions, and preferably accommodates the circuit board therein.

The battery case preferably includes a first partition wall, which is preferably arranged between the first cell accommodating portion and the board accommodating portion.

The battery case preferably includes a second partition wall, which is preferably arranged between the second cell accommodating portion and the board accommodating portion.

According to another preferred embodiment of the present invention there is provided an electric vehicle including at least one battery according to a preferred embodiment of the present invention.

It will be appreciated that features analogous to those described in relation to any of the above aspects may be individual, separable, or in combination with any of the other aspects.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will now be described with reference to the accompanying drawings.

Figure 1:
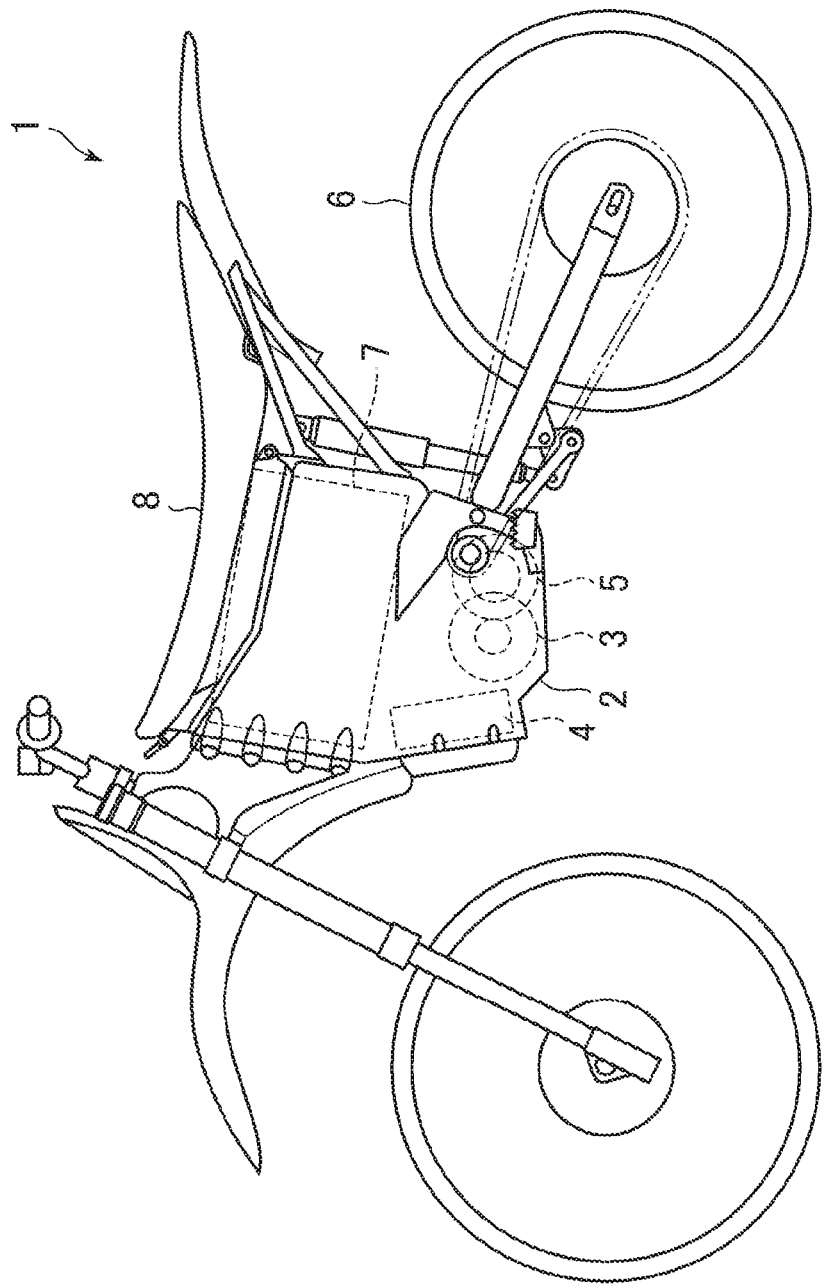
FIG. 1 is a side view of an electric vehicle according to a preferred embodiment of the present invention.
Figure 2:
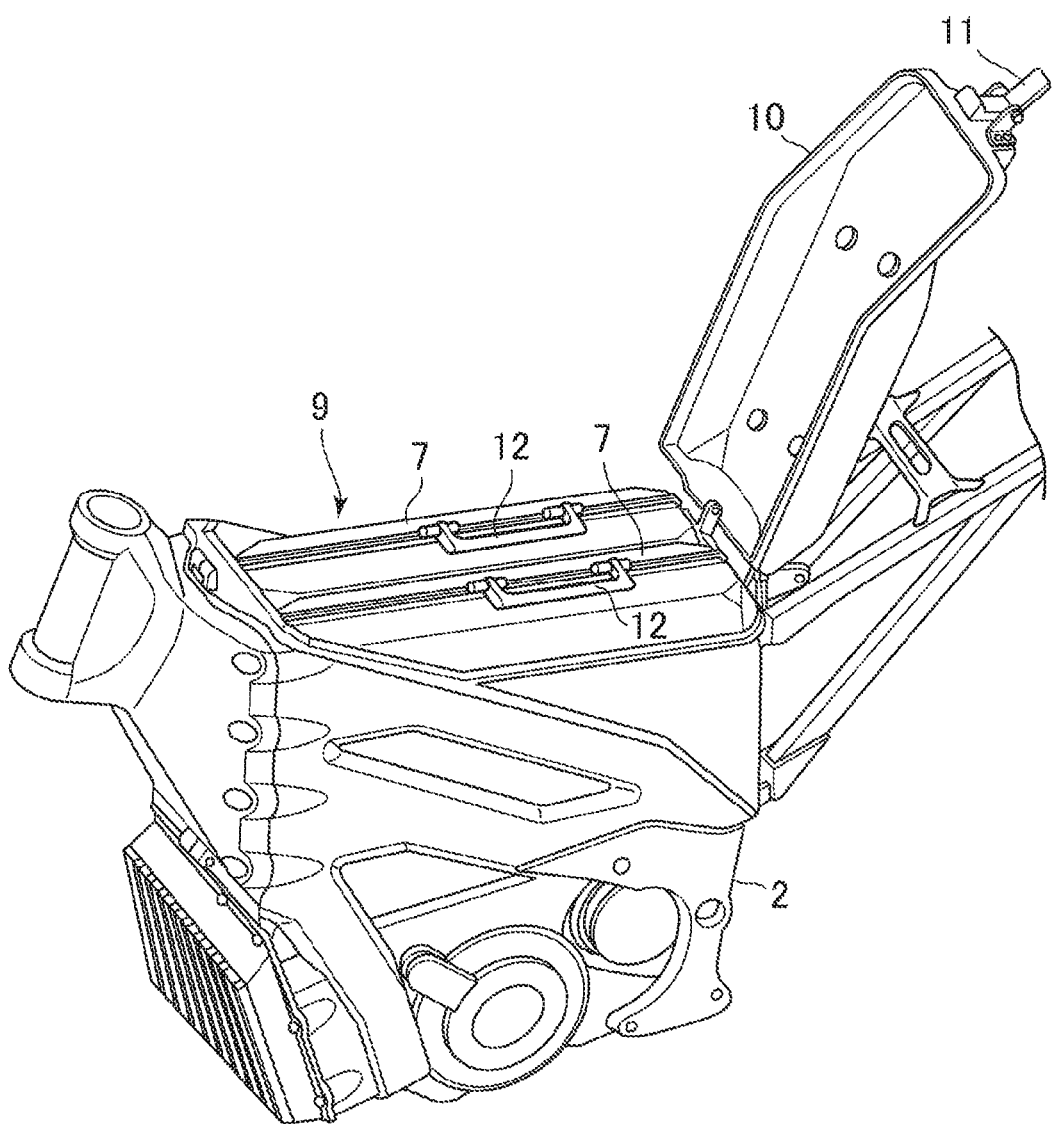
FIG. 2 is a perspective view of a frame of the electric vehicle of FIG. 1.

FIG. 1 shows a side view of an electric vehicle 1 according to a preferred embodiment of the present invention. FIG. 2 shows a perspective view of a frame 2 of the electric vehicle 1. The electric vehicle 1 is, for example, a straddle type electric vehicle. Herein, an electric motorcycle is described as an example of the straddle type electric vehicle. However, it will be appreciated that the electric vehicle 1 according to the present invention is not limited thereto, and may be also applied to other vehicles, for example, a four-wheeled electric vehicle.

In the present preferred embodiment, the electric vehicle 1 includes an electric motor 3 and an electric circuit 4 mounted to the frame 2, and decelerates a rotational output of the electric motor 3 by a reduction gear 5 to transmit rotational output to a rear wheel 6. The electric circuit 4 includes an electronic control unit (ECU), an inverter, and the like.

As a power source of the electric motor 3, a battery 7 according to a preferred embodiment of the present invention is mounted to the electric vehicle 1. The battery 7 is accommodated in a box-shaped battery accommodating portion 9 defined by the frame 2, and is arranged below a saddle or seat 8. In the present preferred embodiment, the battery 7 is charged after being dismounted from the electric vehicle 1. Accordingly, and advantageously, the battery 7 is easily mountable to and dismountable from the electric vehicle 1, that is, mountable to and dismountable from the electric vehicle 1, preferably without using any tool.

The battery accommodating portion 9 preferably has a box-shaped shape having an upward opening. The saddle 8 is dismounted from the electric vehicle 1, and a cover 10 is opened, to allow access to the battery accommodating portion 9 from the outside. Note that, the cover 10 is able to be opened by a simple method using no tool, for example, a method of releasing a latch 11 arranged at an end portion of the cover 10.

A plurality of (for example, two in the illustrated example) batteries 7 are accommodated in the battery accommodating portion 9. Each battery 7 is designed to have a size and a weight suitable for carrying by hand, that is, designed to have, for example, a weight of about 10 kg or less, for example. The plurality of batteries 7 designed in this manner allow easy carrying of the batteries 7 manually or by hand, and ensure a travelling distance and an output necessary for running of the electric vehicle 1.

A handle 12 is provided on an upper portion of each battery 7. The handle 12 is held by hand, and then the battery 7 is pulled up. In this manner, the battery 7 is dismounted from the electric vehicle 1 very easily. Similarly, the battery 7 is mounted to the electric vehicle 1 very easily.

Herein, the "battery" refers to a component obtained by accommodating a secondary battery module, which includes, as needed, a plurality of battery cells each serving as a member that stores electric power therein, in a battery case so that the secondary battery module is handled independently, easily, and safely. For example, a lithium-ion battery is suitable as the secondary battery module.

In addition, in the battery 7 according to the present preferred embodiment, a control circuit called a battery management system (BMS) controls charging and discharging, storing an amount of remaining charge, regenerative control, and the like is accommodated in the battery case together with the secondary battery module.

Figure 3:
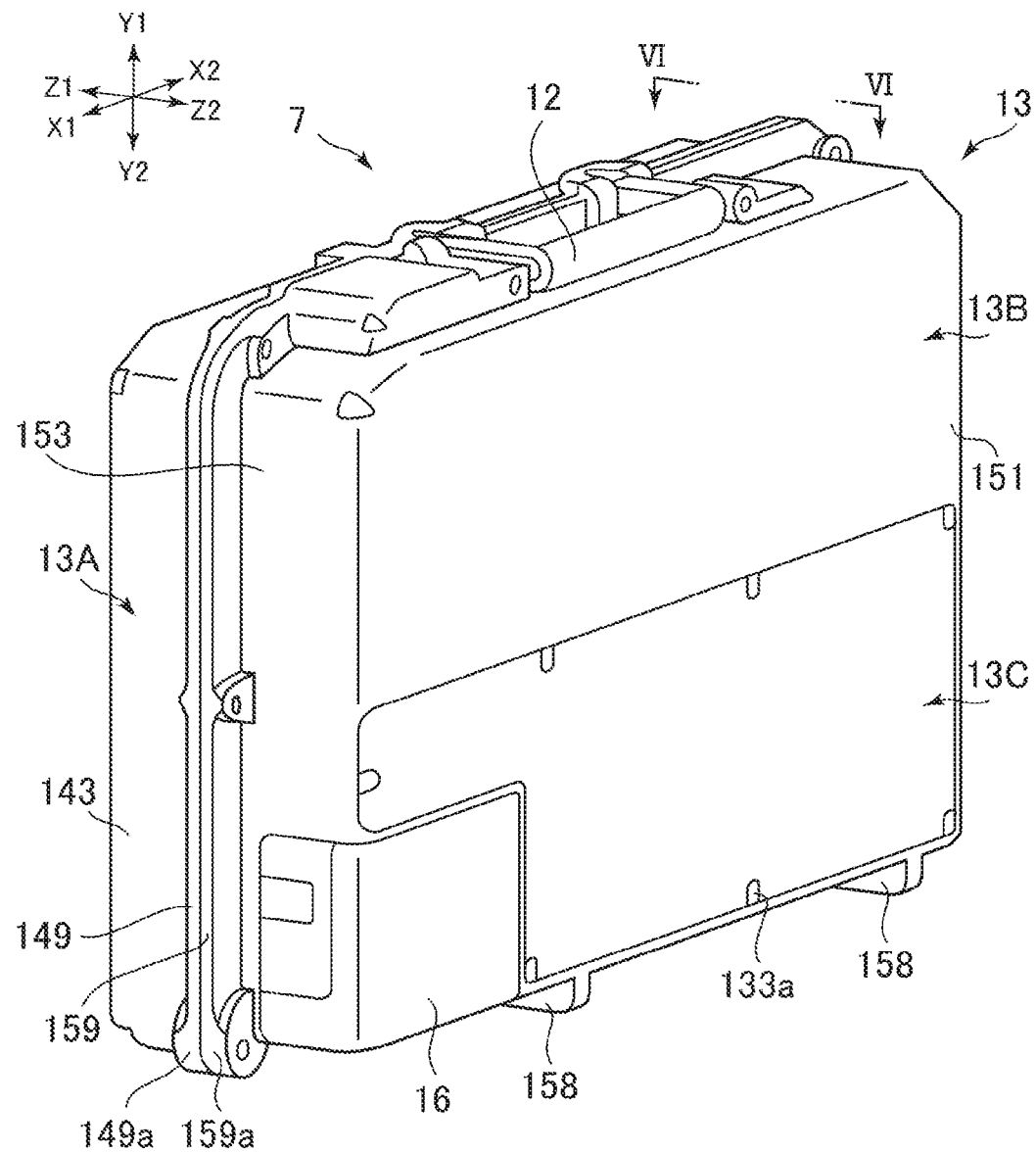
FIG. 3 is a perspective view of a battery according to a preferred embodiment of the present invention.
Figure 4:
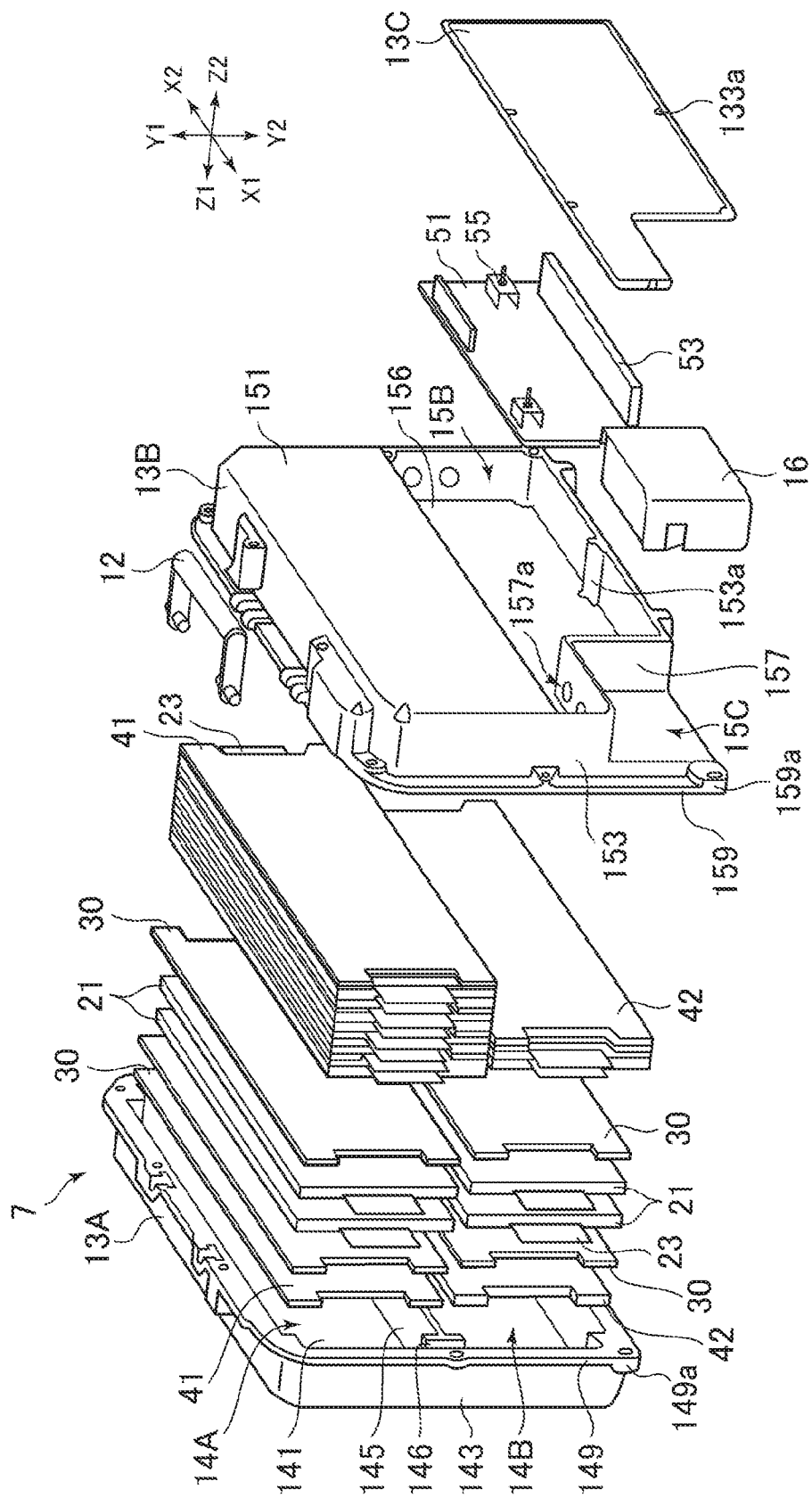
FIG. 4 is an exploded perspective view of the battery of FIG. 3.
Figure 5:
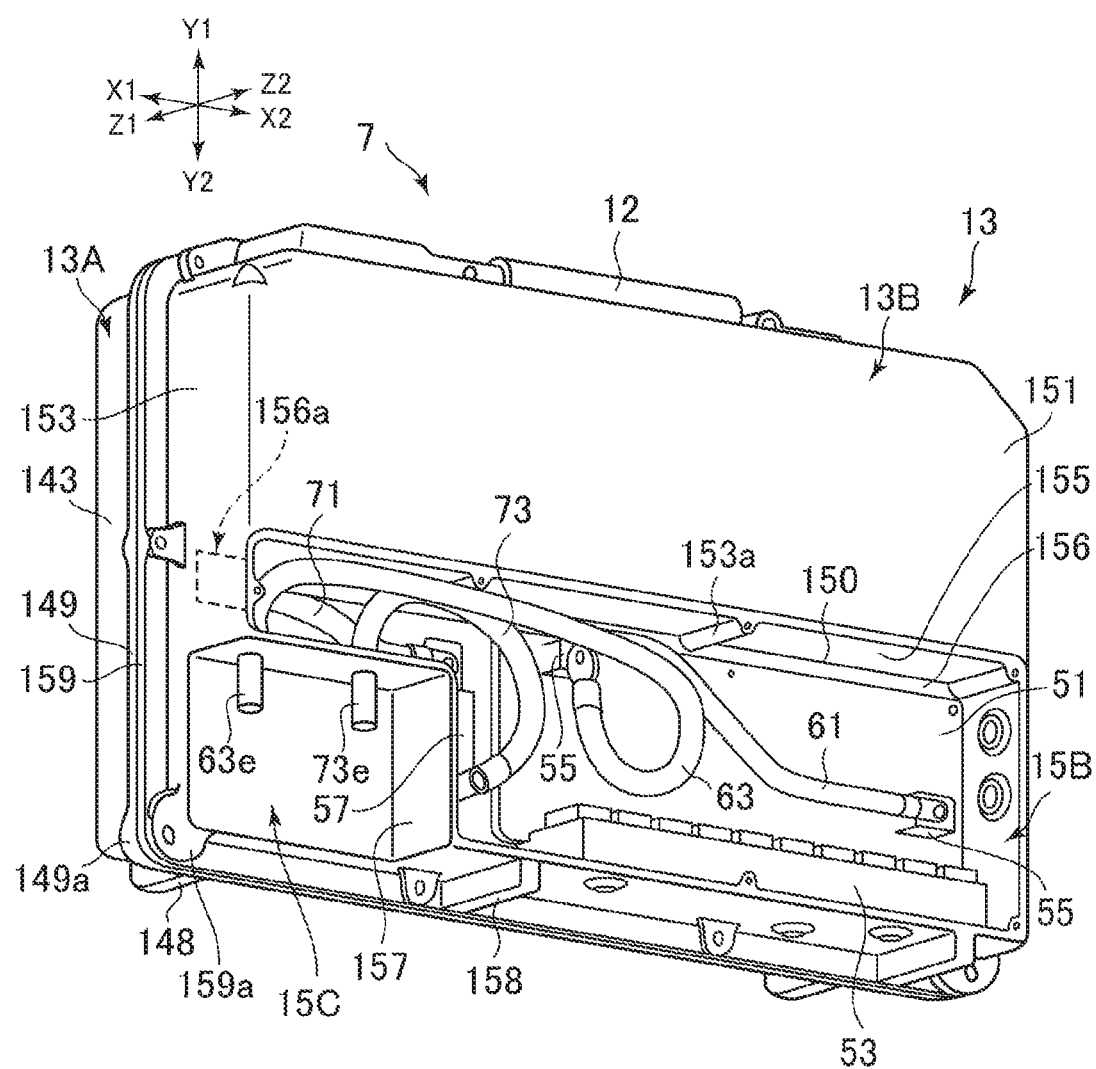
FIG. 5 is a perspective view of the battery of FIG. 3 in a state in which a cover is removed.
Figure 6:
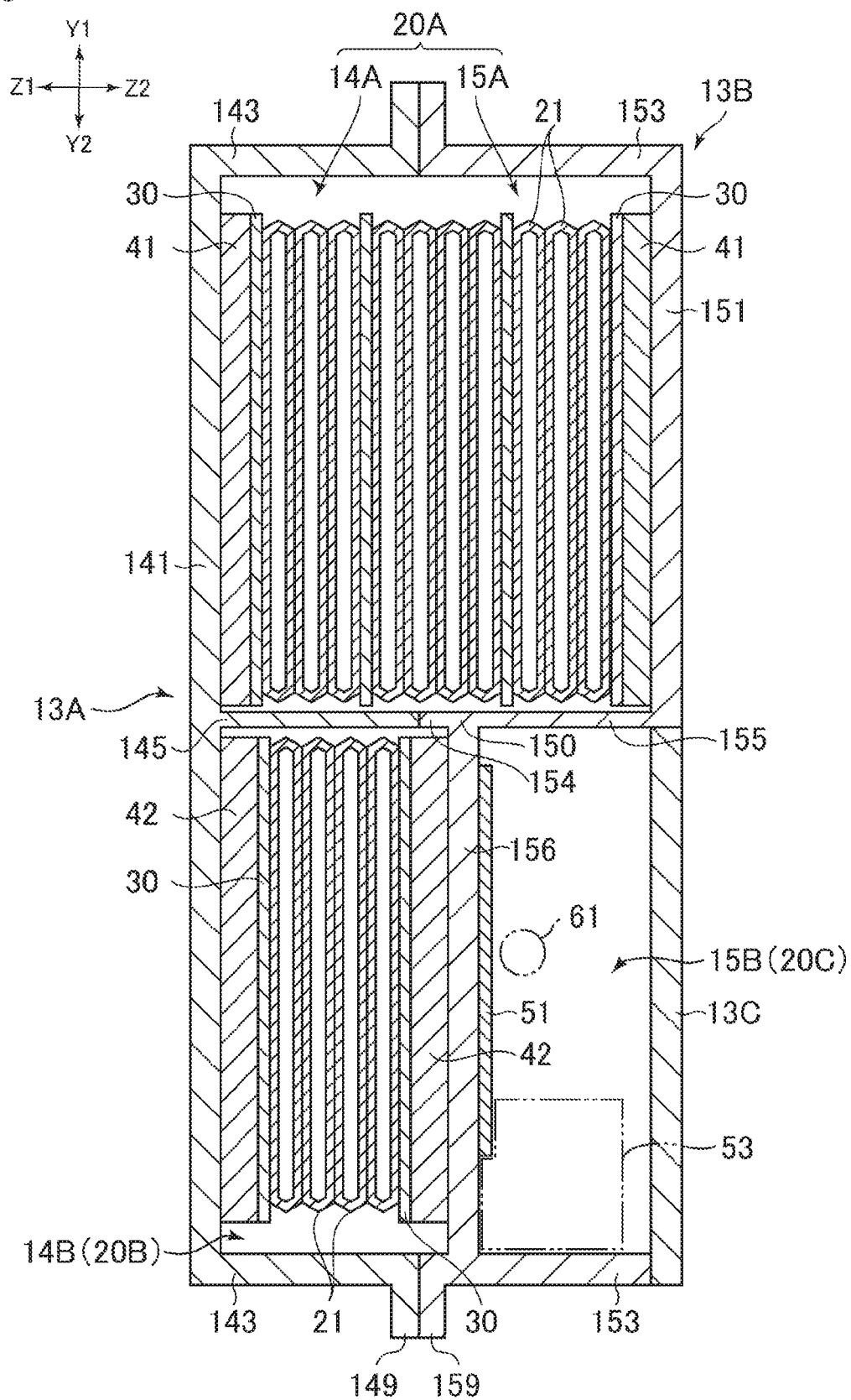
FIG. 6 is a sectional view of the battery of FIG. 3.
Figure 7:
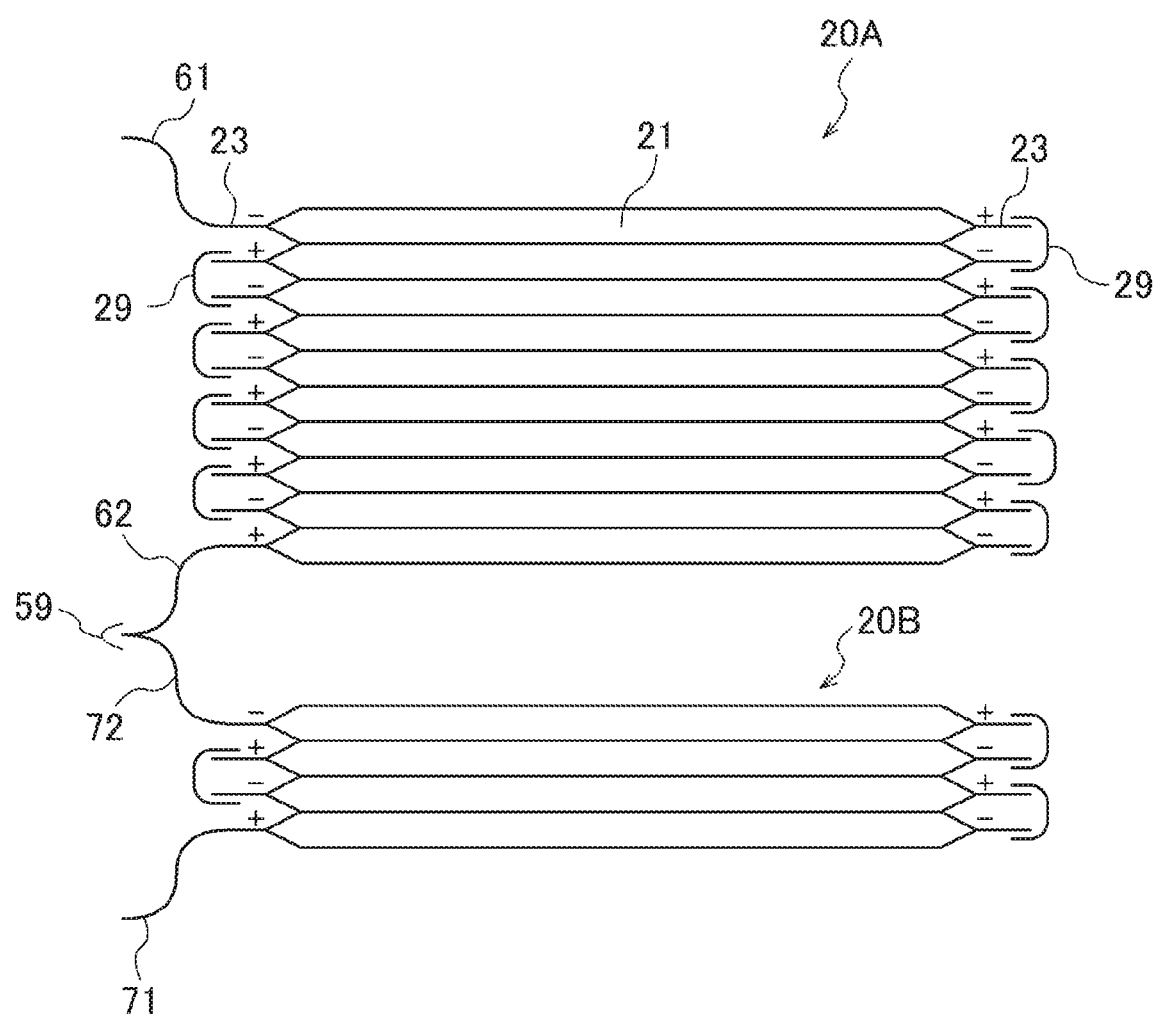
FIG. 7 is a view schematically illustrating electrical connection of battery cells of the battery of FIG. 3.

FIG. 3 shows a perspective view of the battery 7 according to the present preferred embodiment. FIG. 4 shows an exploded perspective view of the battery 7. In FIG. 4, illustrations of lead wires are omitted. FIG. 5 is a perspective view of the battery 7 in a state in which a cover 13C and a connector 16 are removed. FIG. 6 shows a sectional view of the battery 7 taken along the line VI-VI of FIG. 3. FIG. 7 is a view schematically illustrating electric connection of the battery cells 21.

The X1-X2 direction, the Y1-Y2 direction, and the Z1-Z2 direction illustrated in the drawings respectively indicate three directions parallel to sides of a battery case 13 having a rectangular or substantially rectangular parallelepiped shape. In the following description, X1 and X2 represent a front side and a rear side, respectively, and Y1 and Y2 represent an upper side and a lower side, respectively. Further, Z1 and Z2 represent a right side and a left side, respectively.

The X1-X2 direction, the Y1-Y2 direction, and the Z1-Z2 direction correspond to a fore-and-aft (lengthwise) direction, an up-and-down (heightwise) direction, and a lateral (widthwise) direction of the electric vehicle 1, respectively. More specifically, the battery 7 is mounted in a slightly inclined posture on the electric vehicle 1 so that a front side of the battery 7 is positioned upward of a rear side thereof (see FIG. 1). Accordingly, the X1-X2 direction and the Y1-Y2 direction are slightly inclined with respect to the fore-and-aft direction and the up-and-down direction of the electric vehicle 1, respectively.

The battery 7 includes a battery case 13 having a rectangular or substantially rectangular parallelepiped shape and having its thinnest dimension in the lateral direction. The battery case 13 accommodates a plurality of laminated plate-shape battery cells 21 each having a rectangular or substantially rectangular parallelepiped shape, and a circuit board 51 including the BMS mounted thereon and electrically connected to the battery cells 21. Further, a connector 16 that electrically connects the battery 7 to the electric vehicle 1 is mounted to the battery case 13.

It is preferred that a material of the battery case 13 has impact resistance and also has an insulation property. A synthetic resin such as an acrylonitrile-butadiene-styrene (ABS) resin is suitable, for example.

As illustrated in FIG. 6, the battery case 13 includes a first cell accommodating portion 20A having a rectangular or substantially rectangular parallelepiped shape that accommodates a first number of battery cells 21 therein, a second cell accommodating portion 20B having a rectangular or substantially rectangular parallelepiped shape that accommodates a second number of battery cells 21 therein, and a board accommodating portion 20C that accommodates the circuit board 51 therein. The second number is preferably smaller than the first number. The first number and the second number are not particularly limited. However, it is preferred that, for example, the second number be less than half the first number, and that both the first number and the second number be even numbers. This reason is described below. In this illustrated example, the first number is ten and the second number is four.

The first cell accommodating portion 20A occupies an upper half of the battery case 13. The second cell accommodating portion 20B is adjacent to the first cell accommodating portion 20A in the up-and-down direction. The second cell accommodating portion 20B is smaller than the first cell accommodating portion 20A in length in the lateral direction, and occupies a right half of a lower half of the battery case 13. The board accommodating portion 20C is adjacent to the first cell accommodating portion 20A in the up-and-down direction, and is also adjacent to the second cell accommodating portion 20B in the lateral direction. The board accommodating portion 20C occupies a left half of the lower half of the battery case 13. More specifically, the second cell accommodating portion 20B is slightly larger than the board accommodating portion 20C in length in the lateral direction, and occupies a range slightly larger than a lateral half of the lower half of the battery case 13.

A partition wall (first partition wall) 155 is arranged between the first cell accommodating portion 20A and the board accommodating portion 20C, and a partition wall (second partition wall) 156 is arranged between the second cell accommodating portion 20B and the board accommodating portion 20C. With this structure, the board accommodating portion 20C is separated from the first cell accommodating portion 20A and the second cell accommodating portion 20B.

The battery case 13 includes a pair of a right half case body 13A and a left half case body 13B dividable in the lateral direction. The right half case body 13A and the left half case body 13B are dividable along a plane perpendicular or substantially perpendicular to the lateral direction. The right half case body 13A and the left half case body 13B define the first cell accommodating portion 20A and the second cell accommodating portion 20B when combined together in the lateral direction.

The right half case body 13A defines the right half of the battery case 13, and preferably has a box-shaped configuration including a leftward opening. A first recessed portion 14A is provided in an upper half of the right half case body 13A, and a second recessed portion 14B is provided in a lower half thereof.

The left half case body 13B defines the left half of the battery case 13. A box-shaped first recessed portion 15A including a rightward opening is provided in an upper half of the left half case body 13B, and a box-shaped second recessed portion 15B including a leftward opening is provided in a lower half thereof. That is, the first recessed portion 15A is open to an inside of the battery case 13, whereas the second recessed portion 15B is open to an outside of the battery case 13.

When the right half case body 13A and the left half case body 13B are combined together, the first recessed portion 14A of the right half case body 13A and the first recessed portion 15A of the left half case body 13B are combined together to define the first cell accommodating portion 20A. The second recessed portion 14B of the right half case body 13A defines the second cell accommodating portion 20B.

The second recessed portion 15B of the left half case body 13B, which is open to the outside of the battery case, defines the board accommodating portion 20C. The battery case 13 further includes the cover 13C that closes the opening of the second recessed portion 15B. Without dividing the right half case body 13A and the left half case body 13B from each other, a user only dismounts the cover 13C from the battery case 13 to obtain access to the circuit board 51 without touching the battery cells 21.

The right half case body 13A is described in detail. The right half case body 13A includes a rectangular or substantially rectangular main wall 141 occupying an entire right side portion of the battery case 13, a peripheral wall 143 extending leftward from a peripheral edge of the main wall 141, and a partition wall 145 extending leftward from a center of the main wall 141 in the up-and-down direction. The peripheral wall 143 includes an upper portion, a lower portion, a front portion, and a rear portion.

The partition wall 145 extends in the fore-and-aft direction at the center of the main wall 141 in the up-and-down direction, and partitions an inner space of the right half case body 13A. A space above the partition wall 145 corresponds to the first recessed portion 14A, and a space below the partition wall 145 corresponds to the second recessed portion 14B. That is, the first recessed portion 14A is defined by an upper half of the main wall 141, an upper half of the peripheral wall 143, and the partition wall 145, whereas the second recessed portion 14B is defined by a lower half of the main wall 141, a lower half of the peripheral wall 143, and the partition wall 145. In this case, the first recessed portion 14A and the second recessed portion 14B share the partition wall 145. Each of the first recessed portion 14A and the second recessed portion 14B preferably has a size that accommodates the battery cells 21 arranged so that a longitudinal direction of each of the battery cells is along the fore-and-aft direction and a width direction thereof is along the up-and-down direction.

The partition wall 145 is not connected to the front portion of the peripheral wall 143, and a front end of the partition wall 145 is separated from the peripheral wall 143. Accordingly, the first recessed portion 14A and the second recessed portion 14B are not completely separated from each other. A protruding wall 146 extending in the up-and-down direction is provided at the front end of the partition wall 145 (see FIG. 4). Although not shown, a rear end of the partition wall 145 is preferably constructed in the same manner. A gap between the front portion of the peripheral wall 143 and the protruding wall 146 is used to accommodate lead wires described below.

A flange 149 extending outward along a plane perpendicular or substantially perpendicular to the lateral direction is provided at an edge of a left end of the peripheral wall 143. The flange 149 includes a plurality of fastening portions 149a fastened with screws or the like so as to be separated from each other. A rib 148 extending in the lateral direction and having the same height as that of the flange 149 is provided on an outer surface of the lower portion of the peripheral wall 143.

The left half case body 13B is described in detail. The left half case body 13B includes a rectangular or substantially rectangular main wall 151 occupying an upper half of a left side portion of the battery case 13, and a rectangular or substantially rectangular partition wall 156 positioned below and rightward of the main wall 151 so as to be parallel or substantially parallel to the main wall 151. In addition, the left half case body 13B includes a peripheral wall 153 extending in the lateral direction and being connected to peripheral edges of the main wall 151 and the partition wall 156 so as to surround the main wall 151 and the partition wall 156, and a partition wall 155 extending in the lateral direction and being connected to a lower edge of the main wall 151 and an upper edge of the partition wall 156.

The partition wall 156 is arranged at a position close to an edge of a right end of the left half case body 13B, specifically, a position slightly leftward of the edge of the right end of the left half case body 13B. The peripheral wall 153 extends leftward from the peripheral edge of the main wall 151 excluding the lower edge thereof. Further, the peripheral wall 153 extends leftward from the peripheral edge of the partition wall 156 excluding the upper edge thereof, and also slightly extends rightward. A retreat portion 157 is provided at a front lower portion of the peripheral wall 153, and is bent into an L-shape so as to be convex inward.

The partition wall 155 extends in the fore-and-aft direction at the center of the left half case body 13B in the up-and-down direction, and is connected to the lower edge of the main wall 151, the upper edge of the partition wall 156, and a front portion and a rear portion of the peripheral wall 153. A space above the partition wall 155 corresponds to the first recessed portion 15A, and a space below the partition wall 155 corresponds to the second recessed portion 15B. That is, the first recessed portion 15A is defined by the main wall 151, an upper half of the peripheral wall 153, and the partition wall 155, whereas the second recessed portion 15B is defined by the partition wall 156, a lower half of the peripheral wall 153, and the partition wall 155. In this case, the first recessed portion 15A and the second recessed portion 15B share the partition wall 155. Further, the partition wall 156 defines a bottom portion of the second recessed portion 15B.

As illustrated in FIG. 6, the left half case body 13B exhibits an S-shaped cross-section when taken along a plane perpendicular or substantially perpendicular to the fore-and-aft direction. That is, the upper portion of the peripheral wall 153, the main wall 151, the partition wall 155, the partition wall 156, and the lower portion of the peripheral wall 153 define the S-shaped cross-section.

The first recessed portion 15A preferably has a size that accommodates the battery cells 21 arranged so that the longitudinal direction of each of the battery cells is along the fore-and-aft direction and that the width direction thereof is along the up-and-down direction. The second recessed portion 15B preferably has a size that accommodates the circuit board 51 arranged so that a longitudinal direction of the circuit board 51 is along the fore-and-aft direction and that a width direction thereof is along the up-and-down direction.

A right edge of the partition wall 155 and the upper edge of the partition wall 156 are connected to each other at a connection portion 150. The partition wall 155 and the partition wall 156 are, for example, integral and unitary with each other at the connection portion 150. At the connection portion 150, an angle between the partition wall 155 and the partition wall 156 is, for example, 90 degrees. Further, a protruding wall 154 extends rightward from the connection portion 150. The protruding wall 154 is extended rightward from the partition wall 155, and protrudes rightward from the partition wall 156.

The retreat portion 157 is provided at the front lower portion of the peripheral wall 153 so as to cut out a front lower portion of the second recessed portion 15B. On an outer side of the retreat portion 157, there is provided a third recessed portion 15C that is defined by the retreat portion 157 and the partition wall 156 and is open to front, lower, and left sides of the battery case 13. That is, the retreat portion 157 divides the second recessed portion 15B and the third recessed portion 15C. The connector 16 is arranged in the third recessed portion 15C.

In an upper portion of the retreat portion 157, two through-holes 157a passing through the retreat portion 157 in the up-and-down direction are provided at positions separated from each other in the fore-and-aft direction. An end portion 63e of a lead wire 63 and an end portion 73e of a lead wire 73 are inserted into the two through-holes 157a, respectively. Further, in a front upper portion of the partition wall 156, that is, above the retreat portion 157, a through-hole 156a passing through the partition wall 156 in the lateral direction is provided. Lead wires 61 and 71 are inserted into the through-hole 156a. The through-hole 156a is indicated by the broken line in FIG. 5.

On the lower half of the peripheral wall 153 and the partition wall 155 surrounding the second recessed portion 15B, a plurality of bosses 153a to fasten the cover 13C with screws or the like are separated from each other. Positions of the bosses 153a correspond to positions of screw holes 133a in the peripheral edge of the cover 13C. The bosses 153a swell or protrude from the peripheral wall 153 and the partition wall 155 toward an inside of the second recessed portion 15B.

A flange 159 extending outward along a plane perpendicular or substantially perpendicular to the lateral direction is provided at an edge of a right end of the left half case body 13B. The flange 159 includes a plurality of fastening portions 159a that are fastened with screws or the like. A rib 158 extending in the lateral direction and having the same height as that of the flange 159 is provided on an outer surface of the lower portion of the peripheral wall 153.

The flange 149 on the right half case body 13A and the flange 159 on the left half case body 13B are joined together, and the fastening portions 149a and 159a are fastened together with screws or the like, to hermetically seal the battery case 13. For example, a liquid gasket is applied or provided between the flange 149 and the flange 159.

As illustrated in FIG. 6, the right half case body 13A and the left half case body 13B are combined together, to define the first cell accommodating portion 20A and the second cell accommodating portion 20B.

Specifically, the first cell accommodating portion 20A is defined by a combination of the first recessed portion 14A of the right half case body 13A and the first recessed portion 15A of the left half case body 13B. That is, the first cell accommodating portion 20A is defined by the upper half of the main wall 141, the upper half of the peripheral wall 143, the partition wall 145 of the right half case body 13A, the main wall 151, the upper half of the peripheral wall 153, the partition wall 155, and the protruding wall 154 of the left half case body 13B.

Further, the second cell accommodating portion 20B is defined such that the opening of the second recessed portion 14B of the right half case body 13A is closed by the partition wall 156 of the left half case body 13B. More specifically, the second cell accommodating portion 20B is defined by the lower half of the main wall 141, the lower half of the peripheral wall 143, the partition wall 145 of the right half case body 13A, the partition wall 156, the protruding wall 154 of the left half case body 13B, and a portion of the peripheral wall 153 extending rightward of the partition wall 156.

When the right half case body 13A and the left half case body 13B are combined together, the partition wall 145 of the right half case body 13A and the protruding wall 154 of the left half case body 13B are also joined together. Note that, the partition wall 145 and the protruding wall 154 prevent misalignment of the battery cells 21 accommodated in the cell accommodating portions 20A and 20B, but the partition wall 145 and the protruding wall 154 may be omitted.

The board accommodating portion 20C is defined such that the opening of the second recessed portion 15B, which is open to an outside of the left half case body 13B, is closed by the cover 13C. More specifically, the board accommodating portion 20C is defined by the partition wall 156, the lower half of the peripheral wall 153, the partition wall 155 of the left half case body 13B, and by the cover 13C.

In conformity to the shape of the lower half of the peripheral wall 153 of the left half case body 13B including the retreat portion 157, the cover 13C has a shape including a cut-out front lower portion so as to avoid the third recessed portion 15C. The screw holes 133a in the peripheral edge of the cover 13C, and the bosses 153a on the peripheral edge of the second recessed portion 15B are fastened together with screws or the like, to fix the cover 13C to the left half case body 13B.

The connector 16 having a rectangular or substantially rectangular parallelepiped shape is fitted into the third recessed portion 15C positioned in the front lower portion of the left half case body 13B and provided on the outer side of the retreat portion 157 of the peripheral wall 153. The connector 16 is, for example, a female connector (so-called receptacle), and includes a lower surface including an insertion hole (not shown) therein. A male connector (so-called plug) arranged in the electric vehicle 1 (to extend upward) is inserted into the insertion hole.

More specifically, the male connector is arranged inside the battery accommodating portion 9 of the electric vehicle 1 to extend upward from a bottom surface thereof. When the battery 7 is accommodated in the battery accommodating portion 9, along with downward movement of the battery 7, the male connector arranged on the bottom surface of the battery accommodating portion 9 is inserted into the connector 16 arranged on the front lower portion of the battery case 13.

As described above, advantageously, the plurality of battery cells 21 accommodated in the battery case 13 are divided into the two cell accommodating portions 20A and 20B, and the cell accommodating portions 20A and 20B are aligned in the up-and-down direction. In this manner, a reduction of a lateral thickness of the battery case 13 is beneficially achieved. The number of battery cells 21 accommodated in the second cell accommodating portion 20B is preferably smaller than the number of battery cells 21 accommodated in the first cell accommodating portion 20A. Thus, a lateral thickness of the second cell accommodating portion 20B is smaller than a lateral thickness of the first cell accommodating portion 20A. Further, a space defined in this structure, that is, a space adjacent to the second cell accommodating portion 20B in the lateral direction and also adjacent to the first cell accommodating portion 20A in the up-and-down direction is used as the board accommodating portion 20C, to achieve a reduction of the lateral thickness of the battery case 13. It will be appreciated that this advantageous arrangement may be used in other preferred embodiments of the present invention.

Further, the partition wall 155 is arranged between the first cell accommodating portion 20A and the board accommodating portion 20C, and the partition wall 156 is arranged between the second cell accommodating portion 20B and the board accommodating portion 20C. Thus, the board accommodating portion 20C is beneficially separated from the cell accommodating portions 20A and 20B. With this structure, even if or when an electrolyte leaks from the battery cells 21 in the cell accommodating portions 20A and 20B, the leaking electrolyte is prevented or mitigated from entering the board accommodating portion 20C. In particular, the partition wall 155 and the partition wall 156 are integral or unitary with each other at the connection portion 150, to effectively prevent or mitigate the leaking electrolyte from entering the board accommodating portion 20C. Further, the angle at the connection portion 150 between the partition wall 155 and the partition wall 156 is preferably 90 degrees, to achieve downsizing of the cell accommodating portions 20A and 20B and the board accommodating portion 20C.

It should be noted that in the present preferred embodiment, the connector 16 is arranged in the lower portion of the battery case 13. Accordingly, the first cell accommodating portion 20A is arranged in the upper half of the battery case 13, and the second cell accommodating portion 20B and the board accommodating portion 20C are arranged in the lower half of the battery case 13. However, the present invention is not limited to this structure. For example, the first cell accommodating portion 20A may be arranged in the lower half of the battery case 13, and the second cell accommodating portion 20B and the board accommodating portion 20C may be arranged in the upper half of the battery case 13. Further, the first cell accommodating portion 20A may be arranged in a front half of the battery case 13, and the second cell accommodating portion 20B and the board accommodating portion 20C may be arranged in a rear half of the battery case 13. Alternatively, an inverse arrangement may be used. Further, positions of the second cell accommodating portion 20B and the board accommodating portion 20C may be switched relative to each other in the lateral direction.

The first number of (ten in the illustrated example) battery cells 21 are accommodated in the first cell accommodating portion 20A of the battery case 13, and the second number of (four in the illustrated example) battery cells 21 are accommodated in the second cell accommodating portion 20B. The second number is smaller than the first number. The battery cells 21 are accommodated in the cell accommodating portions 20A and 20B in such a state that the longitudinal direction of each of the battery cells is along the fore-and-aft direction, that the width direction thereof is along the up-and-down direction, and that the battery cells are stacked on each other in the lateral direction. A terminal 23 protruding forward and a terminal 23 protruding rearward are arranged on a front end and a rear end of each of the battery cells 21, respectively.

Further, in the first cell accommodating portion 20A, together with the first number of battery cells 21, a plurality of metal plates 30 and a pair of cushion members 41 are stacked in the lateral direction. The pair of cushion members 41 are arranged on outermost lateral sides, respectively. The pair of cushion members 41 are interposed between the battery cells 21 and the battery case 13 in the lateral direction, and are held in contact with the battery case 13. The metal plates 30 are arranged in several gaps defined between the stacked battery cells 21, and in a gap defined between one battery cell 21 and one of the cushion members 41.

Further, also in the second cell accommodating portion 20B, together with the second number of battery cells 21, a plurality of metal plates 30 and a pair of cushion members 42 are stacked in the lateral direction. The pair of cushion members 42 are arranged on outermost lateral sides, respectively. The pair of cushion members 42 are interposed between the battery cells 21 and the battery case 13 in the lateral direction, and are held in contact with the battery case 13. The metal plates 30 are arranged in several gaps defined between the stacked battery cells 21, and in a gap defined between one battery cell 21 and one of the cushion members 42.

The metal plates 30 are rectangular or substantially rectangular plates made of a metal material such as aluminum. Concave cutouts for avoiding the terminals 23 are provided in a front end and a rear end of each of the metal plates 30, respectively. When the battery cells 21 and the metal plates 30 are moved inside the battery case 13 in a planar direction perpendicular to the lateral direction, the metal plates 30 are brought into abutment against inside members of the battery case 13 (such as the peripheral walls 143 and 153, the partition walls 145 and 155, and the protruding wall 146), to prevent damage of the battery cells 21.

Each of the cushion members 41 and 42 is made of, for example, a sponge or foam like material, and preferably has a rectangular or substantially rectangular parallelepiped shape being thinnest in the lateral direction. Each of the cushion members 41 and 42 is interposed between the battery case 13 and the battery cells 21, thus softening an impact transmitted from the battery case 13 to the battery cells 21. Each of the cushion members 41 and 42 is interposed between the battery case 13 and the battery cells 21 in a state of being compressed in the lateral direction.

The battery cells 21, the metal plates 30, and the cushion members 41 and 42 accommodated in the cell accommodating portions 20A and 20B are stacked on each other in the lateral direction corresponding to a direction of dividing the battery case 13, and are sandwiched between the right half case body 13A and the left half case body 13B. With this structure, the battery cells 21, the metal plates 30, and the cushion members 41 and 42 are accommodated easily, and positional stabilization is achieved.

For example, in a state in which the battery cells 21, the metal plates 30, and the cushion members 41 and 42 are stacked on each other in the first recessed portion 14A and the second recessed portion 14B of the right half case body 13A, the left half case body 13B is brought close to the right half case body 13A, and then the right half case body 13A and the left half case body 13B are combined together while the cushion members 41 and 42 are compressed in the stacking direction. At this time, the battery cells 21, the metal plates 30, and the cushion members 41 and 42 are fastened in the stacking direction. Accordingly, in the midst of accommodation and even afterward, it is possible to prevent misalignment in the planar direction perpendicular or substantially perpendicular to the stacking direction.

Figure 8:
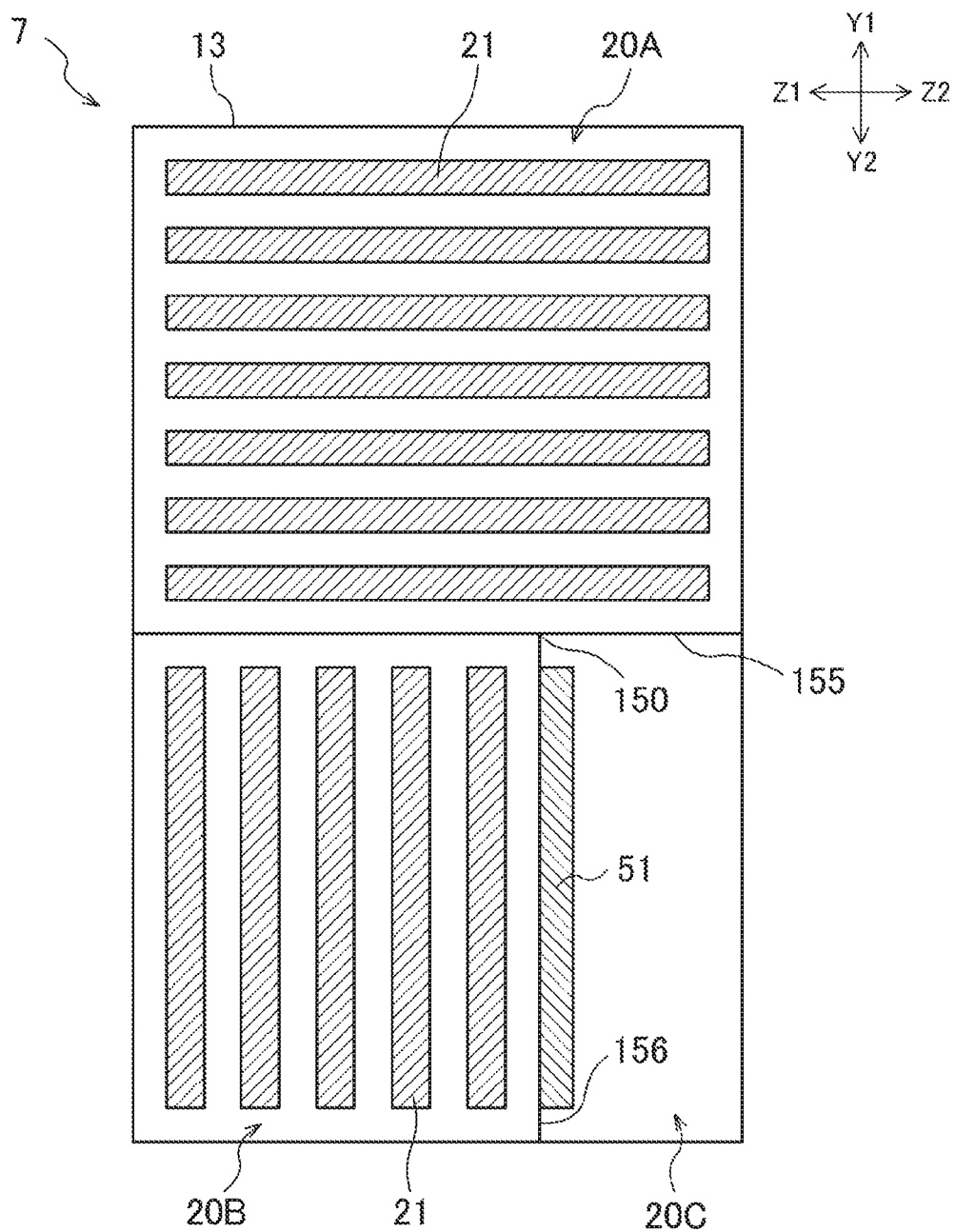
FIG. 8 is a view schematically illustrating a modified arrangement of the battery cells of the battery of FIG. 3.

The present invention is not limited to the preferred embodiments described above. For example, as illustrated in a schematic view in FIG. 8, a direction of stacking the battery cells 21 accommodated in the first cell accommodating portion 20A may be different from a direction of stacking the battery cells 21 accommodated in the second cell accommodating portion 20B. In the example illustrated in FIG. 8, the battery cells are stacked on each other in the up-and-down direction in the first cell accommodating portion 20A, whereas the battery cells are stacked on each other in the lateral direction in the second cell accommodating portion 20B. Note that, it is preferred that a direction, along which the second cell accommodating portion 20B and the board accommodating portion 20C are adjacent to each other, be the same as the direction of stacking the battery cells 21 accommodated in the second cell accommodating portion 20B.

Referring to FIG. 3 to FIG. 7, advantageously the cushion members 42 arranged in the second cell accommodating portion 20B are thicker than the cushion members 41 arranged in the first cell accommodating portion 20A. This is because an entire heat generating amount is lower in the second cell accommodating portion 20B in which the smaller number of battery cells 21 are accommodated, with the result that the second cell accommodating portion 20B is more easily cooled. That is, the cushion members 42 are thicker than the cushion members 41, thus enhancing thermal insulation in the second cell accommodating portion 20B. Thus, a temperature in the first cell accommodating portion 20A and a temperature in the second cell accommodating portion 20B are equalized.

Further, the number of battery cells 21 accommodated in the second cell accommodating portion 20B is beneficially equal to or smaller than a half of the number of battery cells 21 accommodated in the first cell accommodating portion 20A, but the cushion members 42 are thicker than the cushion members 41. Accordingly, a lateral length of the second cell accommodating portion 20B is larger than a half of a lateral length of the first cell accommodating portion 20A. That is, when considering thickening the cushion members 42 in the second cell accommodating portion 20B in addition to securing a space as the board accommodating portion 20C, it is preferred that the number of battery cells 21 accommodated in the second cell accommodating portion 20B be equal to or smaller than the half of the number of battery cells 21 accommodated in the first cell accommodating portion 20A.

The circuit board 51 is provided in the board accommodating portion 20C parallel or substantially parallel to a surface of the board accommodating portion 20C, which extends perpendicular or substantially perpendicular to the lateral direction. The circuit board 51 is fixed, with a screw or the like, to the partition wall 156 as the bottom portion of the second recessed portion 15B in the left half case body 13B of the battery case 13 so as to be open outward. The circuit board 51 is arranged in this manner to achieve a reduction of a lateral thickness of the board accommodating portion 20C, and also the reduction of the lateral thickness of the battery case 13.

Two connectors 55 that connect the lead wires 61,63 to the circuit board 51 are arranged on a surface of the circuit board 51 to be separated from each other in the fore-and-aft direction. In addition to the circuit board 51, a heat sink 53 having a rectangular or substantially rectangular parallelepiped shape and mounted at a lower edge of the circuit board 51, and a fuse that protects the circuit board 51 are accommodated in the board accommodating portion 20C. The fuse 57 is connected to the lead wires 71 and 73.

The lead wires 61 and 71 are led from the cell accommodating portions 20A and 20B into the board accommodating portion 20C through through-hole 156a in the front upper portion of the partition wall 156. The through-hole 156a through which the lead wires 61 and 71 are led is beneficially sealed, e.g. by a curable resin material. With this structure, even when the electrolyte leaks from the battery cells 21 in the cell accommodating portions 20A and 20B, the leaking electrolyte is prevented from entering the board accommodating portion 20C. Note that, the through-hole 156a may be provided in the partition wall 155.

The lead wires 63 and 73 are led from the board accommodating portion 20C into the third recessed portion 15C through the through-holes 157a in the upper portion of the retreat portion 157, and the end portion 63e of the lead wire 63 and the end portion 73e of the lead wire 73 protruding from the through-holes 157a toward the third recessed portion 15C are connected to the connector 16.

As illustrated in FIG. 7, the plurality of battery cells 21 accommodated in the cell accommodating portions 20A and 20B are connected to each other in series. The battery cells 21 are stacked on each other so that the positive terminals 23 alternate with the negative terminals 23, and a pair of the positive terminal 23 and the negative terminal 23 adjacent to each other are connected to each other by a connection member 29. This facilitates series connection of the battery cells 21.

The lead wire 61 to be led into the board accommodating portion 20C is connected to the negative terminal 23 of one of the battery cells 21 accommodated in the first cell accommodating portion 20A. The one of the battery cells 21 is positioned on one end side in the stacking direction. The lead wire 62, which is to be connected to the battery cells 21 accommodated in the second cell accommodating portion 20B, is connected to the positive terminal 23 of another one of the battery cells 21 positioned on the other end side in the stacking direction.

The lead wire 72, which is to be connected to the battery cells 21 accommodated in the first cell accommodating portion 20A, is connected to the negative terminal 23 of one of the battery cells 21 accommodated in the second cell accommodating portion 20B. The one of the battery cells 21 is positioned on one end side in the stacking direction. The lead wire 71 to be led into the board accommodating portion 20C is connected to the positive terminal 23 of another one of the battery cells 21 positioned on the other end side in the stacking direction.

The lead wires 62 and 72 are connected to each other by the connection member 59. The lead wires 62 and 72 may be connected to each other in the cell accommodating portion 20A or 20B, or may be led into the board accommodating portion 20C and connected to each other in the board accommodating portion 20C.

In this case, the sum of the number of battery cells 21 accommodated in the first cell accommodating portion 20A and the number of battery cells 21 accommodated in the second cell accommodating portion 20B is an even number. Thus, both of the lead wires 61 and 71 are arranged on the front side of the battery case to be led into the board accommodating portion 20C through the through-hole 156a. In addition, both of the number of battery cells 21 accommodated in the first cell accommodating portion 20A and the number of battery cells 21 accommodated in the second cell accommodating portion 20B are even numbers. Thus, all of the four lead wires 61, 62, 71, and 72 are arranged on the front side of the battery case to be led into the board accommodating portion 20C through the through-hole 156a.

It will be appreciated that the term straddle-type vehicle or motor vehicle used herein, and as used in the art, is meant to include at least the following terms also used in the art: straddle-type vehicle, saddle-ride type vehicle or motor vehicle, saddle-straddling type vehicle or motor vehicle, and includes: motorcycles and motorbikes as well as motor tricycles and All Terrain Vehicles (ATVs), scooters, mopeds and snowmobiles.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A battery configured to be accommodated in a battery accommodating portion having an upward opening, the battery comprising:

a plurality of battery cells;
a circuit board electrically connected to the plurality of battery cells; and
a battery case having a rectangular or substantially rectangular parallelepiped shape, and that accommodates the plurality of battery cells and the circuit board therein; wherein
the battery case includes:
a first cell accommodating portion having a rectangular or substantially rectangular parallelepiped shape and that accommodates a first number of the plurality of battery cells therein;
a second cell accommodating portion having a rectangular or substantially rectangular parallelepiped shape and that accommodates a second number of the plurality of battery cells therein, the second number being smaller than the first number, and the second cell accommodating portion being shorter than the first cell accommodating portion in one of three directions parallel or substantially parallel to sides of the battery case;
a board accommodating portion adjacent to the second cell accommodating portion in the one of the three directions and that accommodates the circuit board therein;
a first partition wall arranged between the first cell accommodating portion and the board accommodating portion; and
a second partition wall arranged between the second cell accommodating portion and the board accommodating portion, the second partition wall being a rectangular or substantially rectangular partition wall;
the second partition wall extends along a length of the second number of the plurality of battery cells;
a combination of the first partition wall and the second partition wall physically separates the board accommodating portion from the first cell accommodating portion and the second cell accommodating portion such that the circuit board is prevented from being soaked if and when an electrolyte leaks from the first number of the plurality of battery cells or the second number of the plurality of battery cells; and
the second partition wall overlaps a whole area of the circuit board in the one of the three directions.

2. The battery according to claim 1, wherein the first partition wall includes a first edge positioned on a side of the second partition wall, the second partition wall includes a second edge positioned on a side of the first partition wall, and the first edge and the second edge are connected to each other at a connection portion.

3. The battery according to claim 2, wherein the first partition wall and the second partition wall are integral and unitary with each other at the connection portion.

4. The battery according to claim 2, wherein an angle defined by the first partition wall and the second partition wall at the connection portion is 90 degrees.

5. The battery according to claim 1, wherein the second number of the plurality of battery cells are stacked on each other in the one of the three directions.

6. The battery according to claim 1, wherein the first number of the plurality of battery cells are stacked on each other in the one of the three directions.

7. The battery according to claim 1, wherein the circuit board is parallel or substantially parallel to a surface which extends perpendicular or substantially perpendicular to the one of the three directions.

8. The battery according to claim 1, wherein the battery case includes a pair of half case bodies dividable in the one of the three directions, and that defines the first cell accommodating portion and the second cell accommodating portion when the pair of half case bodies are combined together;
one of the pair of half case bodies includes:
an inward opening recessed portion that opens to an inside of the battery case and that defines a portion of the first cell accommodating portion; and
an outward opening recessed portion that opens to an outside of the battery case and that defines at least a portion of the board accommodating portion;
the inward opening recessed portion and the outward opening recessed portion share the first partition wall; and
the second partition wall defines a bottom portion of the outward opening recessed portion.

9. The battery according to claim 8, wherein the battery case includes a cover that covers the outward opening recessed portion.

10. The battery according to claim 1, further comprising a plurality of cushion members arranged between the battery case and the plurality of battery cells.

11. The battery according to claim 10, wherein at least one of the plurality of cushion members that is arranged in the second cell accommodating portion is thicker than at least one of the plurality of cushion members that is arranged in the first cell accommodating portion.

12. The battery according to claim 1, wherein one of the first partition wall and the second partition wall includes a through-hole through which a lead wire connecting the plurality of battery cells and the circuit board to each other is led; and
the through-hole through which the lead wire is led is sealed.

13. The battery according to claim 1, further comprising a connector adjacent to the second cell accommodating portion in the one of the three directions, and that is electrically connected to the circuit board.

14. A battery case having a rectangular or substantially rectangular parallelepiped shape for accommodating a plurality of battery cells and a circuit board electrically connected to the plurality of battery cells, the battery case comprising:
a first cell accommodating portion having a rectangular or substantially rectangular parallelepiped shape and that accommodates a first number of the plurality of battery cells therein;
a second cell accommodating portion having a rectangular or substantially rectangular parallelepiped shape and that accommodates a second number of the plurality of battery cells therein, the second number being smaller than the first number, and the second cell accommodating portion being shorter than the first cell accommodating portion in one of three directions parallel to sides of the battery case;
a board accommodating portion adjacent to the second cell accommodating portion in the one of the three directions and that accommodates the circuit board therein;
a first partition wall arranged between the first cell accommodating portion and the board accommodating portion; and
a second partition wall arranged between the second cell accommodating portion and the board accommodating portion, the second partition wall being a rectangular or substantially rectangular partition wall; wherein the second partition wall extends along a length of the second number of the plurality of battery cells;
a combination of the first partition wall and the second partition wall physically separates the board accommodating portion from the first cell accommodating portion and the second cell accommodating portion such that the circuit board is prevented from being soaked if and when an electrolyte leaks from the first number of the plurality of battery cells or the second number of the plurality of battery cells; and
the second partition wall overlaps a whole area of the circuit board in the one of the three directions.

15. An electric vehicle comprising the battery according to claim 1.

16. A battery configured to be accommodated in a battery accommodating portion having an upward opening, the battery comprising:
a plurality of battery cells;
a circuit board electrically connected to the plurality of battery cells;
a lead wire electrically connecting the plurality of battery cells and the circuit board to each other;
a battery case having a rectangular or substantially rectangular parallelepiped shape, and that accommodates the plurality of battery cells and the circuit board therein; wherein
the battery case includes:
  a first cell accommodating portion having a rectangular or substantially rectangular parallelepiped shape and that accommodates a first number of the plurality of battery cells therein;
  a second cell accommodating portion having a rectangular or substantially rectangular parallelepiped shape and that accommodates a second number of the plurality of battery cells therein, the second number being smaller than the first number, and the second cell accommodating portion being shorter than the first cell accommodating portion in one of three directions parallel or substantially parallel to sides of the battery case;
  a board accommodating portion adjacent to the second cell accommodating portion in the one of the three directions and that accommodates the circuit board therein;
  a first partition wall arranged between the first cell accommodating portion and the board accommodating portion; and
  a second partition wall arranged between the second cell accommodating portion and the board accommodating portion, the second partition wall being a rectangular or substantially rectangular partition wall;
the second partition wall extends along a length of the second number of the plurality of battery cells;
the second partition wall includes a through-hole that extends through the second partition wall; and
the lead wire passes through the through-hole and the through-hole is sealed.

17. An electric vehicle comprising the battery according to claim 16.

18. A battery case having a rectangular or substantially rectangular parallelepiped shape for accommodating a plurality of battery cells, a circuit board, and a lead wire electrically connecting the plurality of battery cells and the circuit board to each other, the battery case comprising:
a first cell accommodating portion having a rectangular or substantially rectangular parallelepiped shape and that accommodates a first number of the plurality of battery cells therein;
a second cell accommodating portion having a rectangular or substantially rectangular parallelepiped shape and that accommodates a second number of the plurality of battery cells therein, the second number being smaller than the first number, and the second cell accommodating portion being shorter than the first cell accommodating portion in one of three directions parallel or substantially parallel to sides of the battery case;
a board accommodating portion adjacent to the second cell accommodating portion in the one of the three directions and that accommodates the circuit board therein;
a first partition wall arranged between the first cell accommodating portion and the board accommodating portion; and
a second partition wall arranged between the second cell accommodating portion and the board accommodating portion, the second partition wall being a rectangular or substantially rectangular partition wall; wherein
the second partition wall extends along a length of the second number of the plurality of battery cells;
the second partition wall includes a through-hole that extends through the second partition wall; and
the lead wire passes through the through-hole and the through-hole is sealed.

* * * * *